Sept. 23, 1952     E. BELDNER     2,611,516

DISPENSING COVER

Filed Nov. 8, 1949

INVENTOR.
EDWARD BELDNER
BY
S.B. Schlesser
Attorney

Patented Sept. 23, 1952

2,611,516

UNITED STATES PATENT OFFICE 2,611,516

DISPENSING COVER

Edward Beldner, Brooklyn, N. Y.

Application November 8, 1949, Serial No. 126,088

3 Claims. (Cl. 222—339)

The subject matter of this invention relates to an improvement in dispensing covers, and achieves the objective of providing means for dispensing from the contents of the container, upon which it is affixed, predetermined amounts of said contents, at the same time serving to prevent the exposure of the contents to air, thereby minimizing the debilitating effects of such exposure on flavor and strength of the remaining contents.

The primary object of the invention is to provide a dispensing cover for use upon vacuum cans of coffee, after the sealed cover has been removed therefrom, to provide for removal of predetermined amounts of coffee and to keep the balance of the contents from exposure to air.

A second object is to provide a dispensing cover which is simple and time-saving to operate, and which can be manufactured at a low cost and in an economical manner.

Another important object of my invention is to eliminate the waste of coffee, which is the result of irregular measuring means, by providing an automatic measuring means which dispenses only the amount of coffee required to make the desired number of servings.

Other salient objects, advantages and functional features will be more readily appreciated from the detailed specification, taken with the accompanying drawings, wherein.

Similar reference characters designate similar parts throughout the different views.

It is to be specifically noted that the embodiment shown and described contemplates the use of the dispensing cover upon vacuum-packed coffee cans of one pound content. Practically all of the various brands of coffee in commercial use, which are packed in vacuum cans, are packed in cans of uniform and standard size and shape, and the embodiment here shown is constructed to fit onto the tops of such cans after the vaccum lids are removed.

However, it is not intended that my invention be restricted to coffee cans or to cans of such size and shape only, but that it contemplates the use of such dispensing cover in connection with any receptacle and any type of contents that said invention may be adapted to within the scope and idea of my invention and the appended claims.

Figure 1:
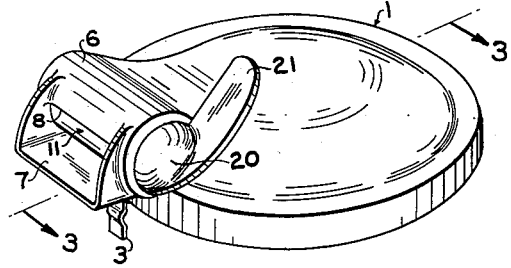
Fig. 1 is a perspective side elevation of a dispensing cover made according to my invention.
Figure 2:
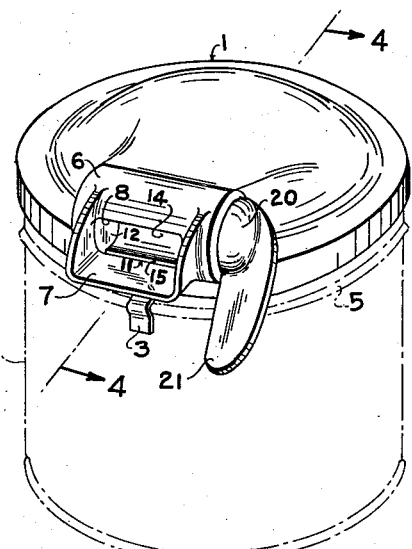
Fig. 2 is a perspective front view of the dispensing cover in position upon a can of coffee.

Illustrative of the embodiment shown and disclosed by Figs. 1 and 2, my invention consists of a hemispherical cover 1 constructed to fit snugly upon the can 2, and to be more fixedly secured by means of clamps 3, which are permanently secured to the rim of the cover 1 by means of pins or rivets 4. The clamps 3 are curved medially to come in registry with the bead 5 which is located around the upper circumference of the can 2.

The cover 1 enlarges frontally into an integral cylindrical shaped housing 6, and extends forward of the housing into an integral shelf portion 7, both of which extend beyond the perimeter of the cover 1. Within the anterior circular surface of the housing is defined an opening 8 which leads directly into the interior of the can 2 and provides the only dispensing opening into the can.

The housing 6 is provided with a closed wall 9 at one end and a circular opening 10 at the other end, adapted to allow within said housing of a hollow cylindrical dispensing member 11, disposed and adapted to rotate within the housing 6 as hereinafter described.

The hollow cylindrical dispensing member 11 is constructed with closed end walls 12 and 13, and a cylindrical wall 14 in which is defined an opening 15 having the same size and shape as the opening 8 in the housing, and disposed to come in registry therewith in dispensing position. A groove 16 is journalled semi-circumferentially around the cylindrical wall 14 near the end wall 13 of the cylinder 11, and is adapted to permit the cylinder 11 to revolve around a threaded stud 17 secured through the bottom of the shelf 7 and projecting into the groove 16. Centered in the wall 13 of the cylinder is a shaft 18 upon which is mounted a turning knob 20 formed integrally with a finger piece 21.

A circumferential flange 19 extends beyond the wall 12 of the cylinder 11 and is disposed to space the wall 12 of the cylinder from the wall 9 of the housing 6. Centered in wall 12 is a shaft 23 which fits into a socket 22 in the wall 9 to permit rotation of the cylinder 11.

A spring element 23 is mounted around the shaft 28, with terminal 24 imbedded within said shaft and curved terminal 25 disposed to encircle stud 26 projecting from the wall 12 of the cylinder 11 and stud 27 projecting from wall 9 of the housing 6, in position.

In assembling the dispensing cover, the cylinder member 11 is rotatably secured within the housing 6 so that the curved spring terminal 25 is engaged around the stud 27 projecting from wall 9 of the housing in addition to the stud 26 of the cylinder member. The threaded stud 17 is then screwed into groove 16 as shown.

Figures 3, 4:
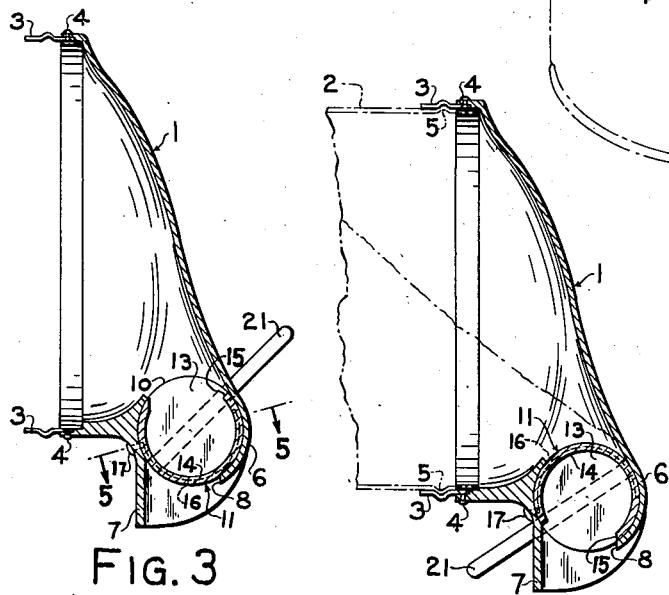
Fig. 3 is a vertical, cross-sectional view taken on lines 3—3 of Fig. 1 showing the dispensing cover in normal position for operation.
Fig. 4 is a vertical, cross-sectional view taken on lines 4—4 of Fig. 2 showing the cover in dispensing position.
Figure 5:
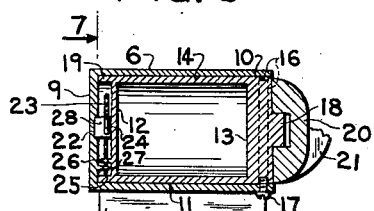
Fig. 5 is a cross-sectional view taken on lines 5—5 of Fig. 3.
Figure 6:
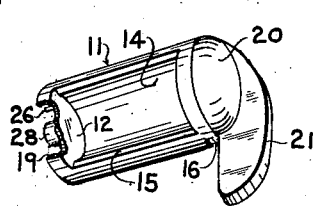
Fig. 6 is a perspective view of the dispensing cylinder.
Figure 7:
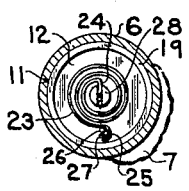
Fig. 7 is a cross-sectional view taken on lines 7—7 of Fig. 5.

In normal position the opening 15 in the rotating cylinder 11 is disposed toward the interior of the cover 1, and the cylindrical wall 14 effectively seals the opening 8 in the housing. It is retained in this position by the resistance of the tension spring element 23 to movement. Holding the can 2 in the inclined position shown in Figs. 3 and 4, part of the contents of the can pours into and fills the hollow chamber of the cylinder 11. Upon turning the cylinder 11 counter-clockwise by means of the finger piece 21, the opening 15 in the cylinder comes in registry with the opening 8 in the housing 6, and the predetermined contents of the cylinder chamber is dispensed through opening 8 for use. When the finger piece 21 is released the twisted tension spring 23 reverts to its normal shape, rotating the cylinder 11 back to the position shown by Fig. 3.

The rotation of the cylinder 11 within the housing 6 beyond the point of registry of openings 8 and 15 is stopped by the stud 17 coming in contact with the end of the groove 16, and rotation of the cylinder in the opposite direction beyond the point of sealing off of the opening 8 with the cylindrical wall 14 is stopped by the contact of the stud 17 with the opposite end of the groove 16.

In addition to the above described means of limiting rotation of the cylinder 11 beyond its fixed radius, projecting lugs upon the exterior surface of the cover may be secured to contact the finger piece 21 at the end of each rotary movement, if desired.

The positions of the spring element 23 and the journalled groove 16 may be interchanged, more than one spring may be used in an embodiment of my invention and various other and additional changes may be made in the steps of construction and arrangement of parts without departing from the spirit and scope of my invention or sacrificing any of the advantages thereof inherent therein.

I claim:

1. In combination with a receptacle of the class described, a dispensing cover adapted to fit said receptacle in air-tight relationship, clamps to secure the cover to the receptacle, said cover having a substantially hemispherical body section extending into an enlarged cylindrical housing with a circular opening at one end thereof and a transverse slot in its anterior circular surface, an integral shelf section projecting from below the slot, a hollow cylinder rotatably secured within said housing, said cylinder being provided with end walls and a circular wall having a transverse slot substantially identical in size and shape with the slot in the housing, means to rotate said cylinder to bring the slots in registry for dispensing the predetermined contents of the cylinder, and means for returning the cylinder to original position in order to take the slots out of registry, seal off the slot in the housing and allow refilling of the cylinder from the contents of the receptacle.

2. In combination with a receptacle of the class described, a dispensing cover adapted to fit said receptacle in air-tight relationship, clamps to secure the cover to the receptacle, said cover having a substantially hemispherical body section extending into an enlarged cylindrical housing with a circular opening at one end thereof and a transverse slot in its anterior circular surface, an integral shelf section projecting from below the slot, a hollow cylinder rotatably secured within said housing, said cylinder being provided with end walls and a circular wall having a transverse slot substantially identical in size and shape with the slot in the housing and adapted to come in registry with said slot in dispensing position, a semi-circular groove journalled around one end of the circular wall of the cylinder, a stud projecting into said groove providing means for rotation of the cylinder within the housing, a shaft in the adjacent end wall of the cylinder, a turning knob and finger piece mounted on said shaft to rotate the cylinder and bring the slots in registry for dispensing the contents of the cylinder, and means for returning the cylinder to original position in order to take the slots out of registry, seal off the slot in the housing with the circular wall of the cylinder, and allow refilling of the cylinder from the contents of the receptacle.

3. In combination with a receptacle of the class described, a dispensing cover adapted to fit said receptacle in air-tight relationship, clamps to secure the cover to the receptacle, said cover having a substantially hemispherical body section extending into an enlarged cylindrical housing with a circular opening at one end thereof and a transverse slot in its anterior circular surface, an integral shelf section projecting from below the slot, a hollow cylinder rotatably secured within said housing, said cylinder being provided with end walls and a circular wall having a transverse slot substantially identical in size and shape with the slot in the housing and adapted to come in registry with said slot in dispensing position, a semi-circular groove journalled around one end of the circular wall of the cylinder, a stud projecting into said groove providing means for rotation of the cylinder within the housing, a shaft in the adjacent end wall of the cylinder, a turning knob and finger piece mounted on said shaft, a flange extending around the other end wall of the cylinder and adapted to space the said wall of the cylinder from the wall of the housing, a shaft centered in said end wall and rotatable in a socket in the said wall of the housing to provide additional means to rotate the cylinder, a spring member having one terminal secured to said shaft and the other terminal disposed to be arrested by a stud projecting from the end wall of the cylinder and a reciprocal stud projecting from the wall of the housing, whereby the cylinder may be rotated to bring the slots in registry to dispense the contents of the cylinder and whereby, upon release of the finger piece, the tension upon the spring member rotates the cylinder to return it to normal position, bringing the slots out of registry, sealing off the slot in the housing with the circular wall of the cylinder and allowing the refilling of the cylinder from the contents of the receptacle.

EDWARD BELDNER.

REFERENCES CITED

The following references are of record in the file of this patent:

UNITED STATES PATENTS

| Number | Name | Date |
|---|---|---|
| 950,286 | Hauty | Feb. 22, 1910 |
| 1,368,270 | Lissman | Feb. 15, 1921 |
| 1,438,595 | Hale | Dec. 12, 1922 |
| 1,530,757 | Clewett | Mar. 24, 1925 |
| 1,710,295 | Campbell | Apr. 23, 1929 |
| 1,728,526 | Brunhoff | Sept. 17, 1929 |
| 2,165,933 | Martin | July 11, 1939 |
| 2,259,710 | Stern | Oct. 21, 1941 |